United States Patent
Lee et al.

(10) Patent No.: US 10,701,348 B2
(45) Date of Patent: Jun. 30, 2020

(54) HIGH BRIGHTNESS STEREOSCOPIC IMAGE SCREENING DEVICE USING MODULATOR ASYMMETRY DRIVE, AND METHOD FOR OPERATING SAME

(71) Applicant: RealD Inc., Beverly Hills, CA (US)

(72) Inventors: Young Hoon Lee, Calabasas, CA (US); Chul Woo Lee, Seoul (KR); Bong Jae So, Seoul (KR)

(73) Assignee: REALD INC., Beverly Hills, CA (US)

(*) Notice: Subject to any disclaimer, the term of this patent is extended or adjusted under 35 U.S.C. 154(b) by 0 days.

(21) Appl. No.: 15/573,117

(22) PCT Filed: May 9, 2016

(86) PCT No.: PCT/KR2016/004796
§ 371 (c)(1),
(2) Date: Nov. 9, 2017

(87) PCT Pub. No.: WO2016/182280
PCT Pub. Date: Nov. 17, 2016

(65) Prior Publication Data
US 2018/0131929 A1    May 10, 2018

(30) Foreign Application Priority Data
May 11, 2015 (KR) .......................... 10-2015-0065319

(51) Int. Cl.
*H04N 13/31* (2018.01)
*H04N 13/363* (2018.01)
(Continued)

(52) U.S. Cl.
CPC ............. *H04N 13/31* (2018.05); *G03B 21/28* (2013.01); *G03B 35/26* (2013.01); *H04N 9/3105* (2013.01);
(Continued)

(58) Field of Classification Search
CPC .. H04N 13/0409; H04N 9/3105; H04N 13/31; H04N 13/363; H04N 13/204;
(Continued)

(56) References Cited

U.S. PATENT DOCUMENTS

2013/0141624 A1    6/2013 Tomizawa et al.
2017/0078656 A1*   3/2017 Lee ........................ G02B 30/25

FOREIGN PATENT DOCUMENTS

EP          831353 A1      3/1998
KR    10-2007-0095101 A    9/2007
(Continued)

OTHER PUBLICATIONS

Extended European search report in co-pending EP Application No. 16792926.4, dated Aug. 31, 2018.
(Continued)

*Primary Examiner* — Charles S Chang
(74) *Attorney, Agent, or Firm* — Penny L. Lowry; Neil G. Mothew

(57) ABSTRACT

Proposed is a stereoscopic image screening device. The stereoscopic image screening device comprising: a polarized light splitter for spatially splitting and emitting an image light emitted from a projector into transmitted light and one or more reflected lights according to polarization components; a first modulator for emitting the transmitted light on a screen by performing modulation in a way allowing different polarizations as the transmitted light is alternately emitted as a left image or a right image in a time-division scheme; and a second modulator for emitting the reflected light on the screen by performing modulation in a way allowing different polarizations as the reflected light is alternately emitted to a left image or a right image in a time-division scheme, wherein the first modulator and the second modulator are set in a manner that the phase delay of
(Continued)

the first modulator is any one of $0\lambda$ and $\frac{1}{2}\lambda$, and the phase delay of the second modulator is the other one of $0\lambda$ and $\frac{1}{2}\lambda$ at a specific point of time.

20 Claims, 15 Drawing Sheets

(51) Int. Cl.
  *G03B 21/28* (2006.01)
  *G03B 35/26* (2006.01)
  *H04N 13/204* (2018.01)
  *H04N 13/337* (2018.01)
  *H04N 13/261* (2018.01)
  *H04N 9/31* (2006.01)

(52) U.S. Cl.
  CPC .......... *H04N 9/3167* (2013.01); *H04N 13/204* (2018.05); *H04N 13/261* (2018.05); *H04N 13/337* (2018.05); *H04N 13/363* (2018.05)

(58) Field of Classification Search
  CPC .. H04N 13/337; H04N 13/261; H04N 9/3167; G03B 21/28; G03B 35/26
  USPC ........................................................... 349/15
  See application file for complete search history.

(56) References Cited

FOREIGN PATENT DOCUMENTS

| KR | 10-2010-0091134 A | 8/2010 |
| KR | 10-2012-0033738 A | 4/2012 |
| KR | 10-1453451 B1 | 10/2014 |
| KR | 101453451 B1 | 10/2014 |

OTHER PUBLICATIONS

International search report and written opinion of international searching authority in co-pending PCT/KR2016/004796, dated Jul. 21, 2016.

\* cited by examiner

HIGH BRIGHTNESS STEREOSCOPIC IMAGE SCREENING DEVICE USING MODULATOR ASYMMETRY DRIVE, AND METHOD FOR OPERATING SAME

TECHNICAL FIELD

The present invention relates to a high-brightness stereoscopic image display apparatus using a polarizing beam splitter configured such that a modulator on a transmitted beam path and a modulator on a reflected beam path are asymmetrically driven, each of the modulators has a single liquid crystal layer, and no half wave plates are used, whereby brightness is improved.

BACKGROUND ART

In general, a stereoscopic image (or a three-dimensional (3D) image) is realized by projecting different images to the two eyes of a user. For a stereoscopic image projected on a large-sized screen in a movie theater, mainly used is a polarization method in which a left image and a right image are transmitted through polarizing glasses that include left and right polarizing lenses having different polarizing directions which are perpendicular to each other. Images are captured using two cameras, the two captured images are converted using a polarizing means such that the polarizing directions of the images are perpendicular to each other, the images having polarizing directions perpendicular to each other are displayed on a screen, and a user views the images captured by the two cameras through his/her left and right eyes in the state in which the user wears the polarizing glasses, whereby a stereoscopic image is realized.

FIG. 1 is a view showing the structure of a conventional dual projector system for displaying a stereoscopic image.

In order to display a stereoscopic image using the polarization method as described above, the conventional dual projector system is configured such that one of the two-dimensional (2D) projectors 1 and 2 emits a left image and the other of the two-dimensional (2D) projectors 1 and 2 emits a right image. These images pass through polarizing filters 3 and 4, polarizing directions of which are perpendicular to each other, and are then projected on a screen 5. A viewer views the left image and the right image, which overlap each other on the screen 5, through a left image lens 7 and a right image lens 8 of polarizing glasses 6 in the state in which the viewer wears the polarizing glasses 6, whereby a depth effect is acquired.

In the above method, different polarizations may be applied to the left image and the right image, irrespective of whether the polarization is linear polarization or circular polarization.

The conventional dual projector type stereoscopic image display system has been replaced by a single projector system, which is configured such that a projector alternately emits a left image and a right image.

FIG. 2 is a view illustrating a circular polarizing filter type single projector system.

As shown in FIG. 2, the single projector type stereoscopic image display system includes a projector 201 for alternately emitting a left image and a right image, a circular polarizing filter unit 202 including a left image polarizing filter and a right image polarizing filter, and a filter driving unit 203 for rotating the circular polarizing filter unit 202 in synchronization with the emission of the left image and the emission of the right image by the projector 201. In addition, as shown in FIG. 2, the single projector system may further include a synchronization unit 204 for synchronizing the emission of the left image by the projector 201 with the emission of the right image by the projector 201 and transmitting the acquired synchronization information to the filter driving unit 203.

When stereoscopic image content, in which left images and right images are sequentially stored, is input to the projector 201, the projector 201 continuously emits the stereoscopic image content. As described above, the circular polarizing filter unit 202 includes the left image polarizing filter and the right image polarizing filter. The circular polarizing filter unit 202 is rotated such that the left image polarizing filter is located at an emission port of the projector 201 when each left image is emitted by the projector 201 and such that the right image polarizing filter is located at the emission port of the projector 201 when each right image is emitted by the projector 201.

In the single projector type stereoscopic image display system described above, however, brightness is greatly reduced because the image light emitted by a single projector is split into left and right images.

DISCLOSURE

Technical Problem

In order to solve the problem with the conventional single projector system, i.e. to prevent the reduction of brightness, a stereoscopic image display apparatus that projects a transmitted beam and a reflected beam on a screen using a polarizing beam splitter, thereby improving brightness, has been proposed. Specifically, stereoscopic image light including a left image and a right image that are sequentially emitted by a projector is split into at least one transmitted beam and at least one reflected beam based on polarized components using a polarizing beam splitter, the transmitted beam and the reflected beam are modulated by modulators so as to have different polarizing directions depending on the time at which the left image and the right image are emitted, and the modulated beams are overlapped on a screen.

In the above apparatus, each modulator is configured to have two liquid crystal layers. However, the number of transparent electrodes that are used in the liquid crystal layers of each modulator is greater than the number of transparent electrodes that are used in a single liquid crystal cell, whereby brightness is reduced to a certain extent.

In addition, the transmitted beam and the reflected beam, which are split by the polarizing beam splitter, have linearly polarized components that are perpendicular to each other. In order to modulate the transmitted beam and the reflected beam into circularly polarized beams having the same direction, therefore, a half wave plate is provided at any one selected from between a transmitted beam path and a reflected beam path. As a result, brightness is somewhat reduced.

The present invention has been made to solve the above problems, and it is an object of the present invention to provide an apparatus that realizes a high-brightness stereoscopic image by asymmetrically driving modulators and a method of driving the same.

Technical Solution

In accordance with an aspect of the present invention, the above and other objects can be accomplished by the provision of a stereoscopic image display apparatus including a polarizing beam splitter for spatially splitting image light emitted by a projector into at least one transmitted beam and at least one reflected beam based on polarized components, a first modulator for modulating the transmitted beam so as to have different polarized beams when the transmitted beam is alternately emitted as a left image and a right image in a time division fashion such that the modulated beam is projected on a screen, and a second modulator for modulating the reflected beam so as to have different polarized beams when the reflected beam is alternately emitted as a left image and a right image in a time division fashion such that the modulated beam is projected on the screen, wherein the first modulator and the second modulator are set such that, at a specific time, a phase delay of the first modulator is one selected from between $0\lambda$ and $\frac{1}{2}\lambda$ and a phase delay of the second modulator is the other selected from between $0\lambda$ and $\frac{1}{2}\lambda$.

The stereoscopic image display apparatus may use no half wave plates. Consequently, the transmitted beam incident on the first modulator and the reflected beam incident on the second modulator may have linearly polarized components that are perpendicular to each other.

In addition, each of the first modulator and the second modulator may be configured to have a single liquid crystal layer.

In addition, each of the first modulator and the second modulator may include a linear polarizer, a single liquid crystal layer, and a quarter wave plate. In the case in which the stereoscopic image display apparatus uses half wave plates, a first slow axis of a quarter wave plate of the first modulator and a second slow axis of a quarter wave plate of the second modulator may be configured so as to have a difference of 90 degrees therebetween. In the case in which the stereoscopic image display apparatus uses no half wave plates, the first slow axis of the quarter wave plate of the first modulator and the second slow axis of the quarter wave plate of the second modulator are disposed in the same direction.

In addition, each of the first modulator and the second modulator may have a structure in which the linear polarizer, the single liquid crystal layer, and the quarter wave plate are sequentially disposed. Alternatively, each of the first modulator and the second modulator may have a structure in which the linear polarizer, the quarter wave plate, and the single liquid crystal layer are sequentially disposed. Here, the linear polarizer may be omitted.

Also, in the case in which each of the first modulator and the second modulator has a phase delay of $0\lambda$ when voltage having a first magnitude (hereinafter, referred to as 'VH') is applied to each of the first modulator and the second modulator and in the case in which each of the first modulator and the second modulator has a phase delay of $\frac{1}{2}\lambda$ when voltage having a second magnitude (hereinafter, referred to as 'VL') is applied to each of the first modulator and the second modulator, a first voltage pattern, in which +VL, +VH, −VL, and −VH are repeated, may be applied to the first modulator, and a second voltage pattern, in which −VH, +VL, +VH, and −VL are repeated, may be applied to the second modulator at a time corresponding to the first voltage pattern.

In addition, one of the first modulator and the second modulator may be configured to emit a right circularly polarized beam modulated through a phase delay of $0\lambda$ during a first time period, and the other of the first modulator and the second modulator may be configured to emit a right circularly polarized beam modulated through a phase delay of $\frac{1}{2}\lambda$ during the first time period. In this case, one of the first modulator and the second modulator may be configured to emit a left circularly polarized beam modulated through a phase delay of $\frac{1}{2}\lambda$ during a second time period, which follows the first time period, and the other of the first modulator and the second modulator may be configured to emit a left circularly polarized beam modulated through a phase delay of $0\lambda$ during the second time period.

In the above description, each of the right circularly polarized beam and the left circularly polarized beam may correspond to any one selected from between a left image and a right image.

Also, in the case in which the stereoscopic image display apparatus is configured to further use half wave plates, a first orientation direction of a single liquid crystal layer of the first modulator and a second orientation direction of a single liquid crystal layer of the second modulator may be configured so as to have a difference of 90 degrees therebetween.

Also, in the case in which the single liquid crystal layer of the first modulator and the single liquid crystal layer of the second modulator are configured in the form of an optically compensated bend (OCB) irrespective of whether or not the half wave plates are used, the first slow axis and the first orientation direction and the second slow axis and the second orientation direction may be configured so as to have a difference of 90 degrees therebetween.

In accordance with another aspect of the present invention, there is provided a stereoscopic image display apparatus including a polarizing beam splitter for spatially splitting image light emitted by a projector into at least one transmitted beam and at least one reflected beam based on polarized components, a first modulator having a single liquid crystal layer, the first modulator being configured to modulate the transmitted beam into a first circularly polarized beam, which is one selected from between a left circularly polarized beam and a right circularly polarized beam modulated through a phase delay of $0\lambda$, during a first time period and to modulate the transmitted beam into a second circularly polarized beam, which is the other selected from between a left circularly polarized beam and a right circularly polarized beam modulated through a phase delay of $\frac{1}{2}\lambda$, during a second time period, which follows the first time period, and a second modulator having a single liquid crystal layer, the second modulator being configured to modulate the reflected beam into the first circularly polarized beam modulated through a phase delay of $\frac{1}{2}\lambda$ during the first time period and to modulate the reflected beam into the second circularly polarized beam modulated through a phase delay of $0\lambda$ during the second time period.

In this case, the stereoscopic image display apparatus may use no half wave plates, whereby the transmitted beam incident on the first modulator and the reflected beam incident on the second modulator may have linearly polarized components that are perpendicular to each other. Here, a first slow axis of a quarter wave plate of the first modulator and a second slow axis of a quarter wave plate of the second modulator may be disposed in the same direction.

In accordance with a further aspect of the present invention, there is provided a stereoscopic image display apparatus including a polarizing beam splitter for spatially splitting image light emitted by a projector into at least one transmitted beam having a first linearly polarized component and at least one reflected beam having a second linearly polarized component, which is perpendicular to the first linearly polarized component, based on polarized components, a first modulator configured to modulate the transmitted beam having the first linearly polarized component into a first circularly polarized beam, which is one selected from between a left circularly polarized beam and a right circularly polarized beam modulated through a phase delay of 0λ, during a first time period and to modulate the transmitted beam into a second circularly polarized beam, which is the other selected from between a left circularly polarized beam and a right circularly polarized beam modulated through a phase delay of ½ λ, during a second time period, which follows the first time period, and a second modulator configured to modulate the reflected beam having the second linearly polarized component into the first circularly polarized beam modulated through a phase delay of ½ λ during the first time period and to modulate the reflected beam into the second circularly polarized beam modulated through a phase delay of 0λ during the second time period.

Here, each of the first modulator and the second modulator may be configured to have a single liquid crystal layer, and a first slow axis of a quarter wave plate of the first modulator and a second slow axis of a quarter wave plate of the second modulator may be disposed in the same direction.

Advantageous Effects

According to the embodiments of the present invention described above, it is possible to acquire a high-brightness stereoscopic image using single liquid crystal type modulators and at the same time to emit a left image and a right image in the state in which the left image and the right image are symmetrical with each other in terms of transmittance, crosstalk, color, etc. through asymmetrical driving of the modulators, thereby improving the quality of the stereoscopic image In addition, it is possible to omit half wave plates from a conventional stereoscopic image display apparatus, since the modulators are asymmetrically driven, thereby reducing manufacturing cost and further improving brightness.

BEST MODE

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out.

The following detailed description includes detailed matters to provide a full understanding of the present invention. However, it will be apparent to those skilled in the art that the present invention can be carried out without the detailed matters. In some cases, in order to prevent the concept of the present invention from being ambiguous, structures and apparatuses of the known art will be omitted, or will be shown in the form of a block diagram based on the main functions of each structure and apparatus.

First, in accordance with an aspect of the present invention, a high-brightness stereoscopic image display apparatus using a polarizing beam splitter configured such that brightness is improved using a modulator having a single liquid crystal layer and a method of driving the same are proposed. To this end, a stereoscopic image display apparatus using a polarizing beam splitter to which the present invention is applicable will be described first.

Figure 1:
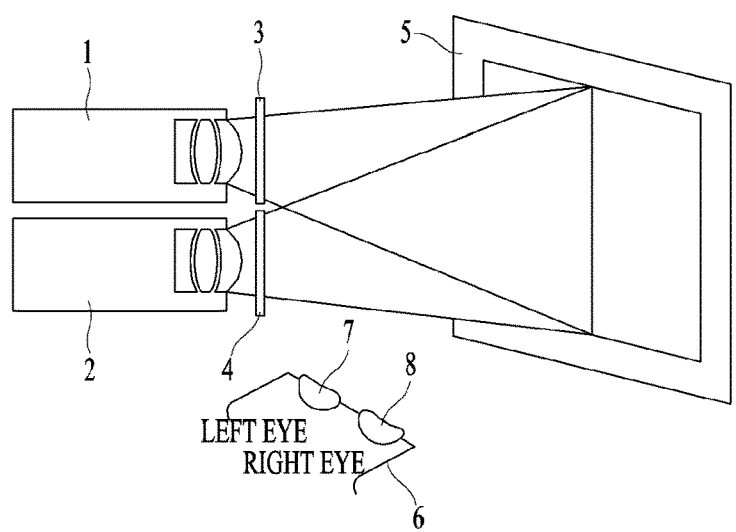
FIG. 1 is a view showing the structure of a conventional dual projector system for displaying a stereoscopic image.
Figure 2:
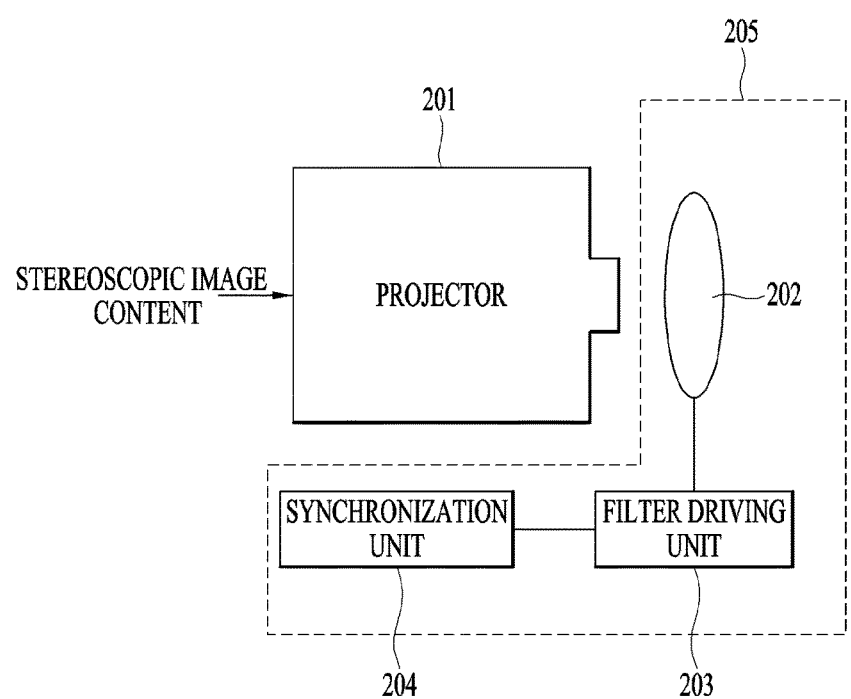
FIG. 2 is a view illustrating a circular polarizing filter type single projector system.
Figure 3:
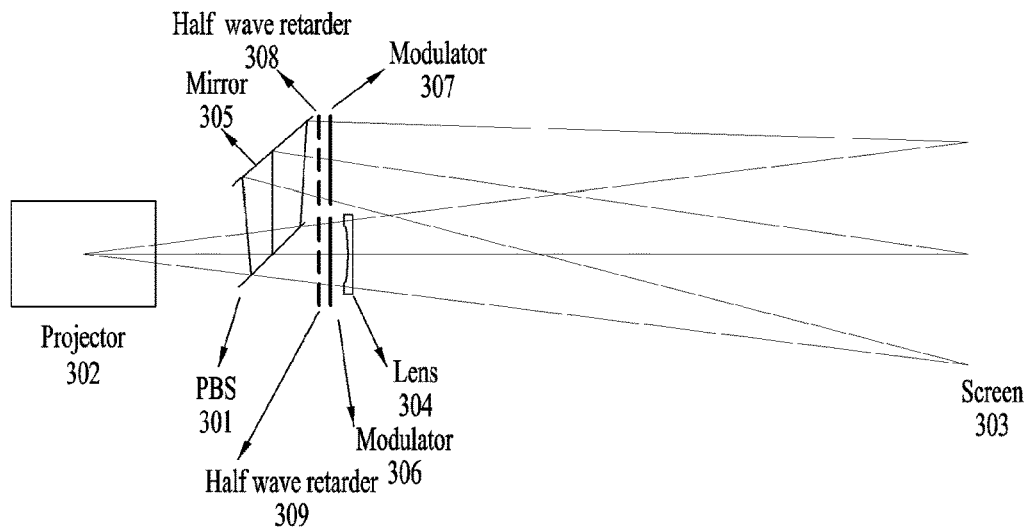
FIG. 3 is a view illustrating an example of a stereoscopic image display apparatus using a polarizing beam splitter to which the present invention is applicable.

FIG. 3 is a view illustrating an example of a stereoscopic image display apparatus using a polarizing beam splitter to which the present invention is applicable.

In the stereoscopic image display apparatus shown in FIG. 3, light emitted by a projector 302 is split into two beams using a polarizing beam splitter (PBS) 301, the split beams are processed, and the processed beams are overlapped on a screen 303 in order to improve brightness.

Specifically, image light emitted by the projector 302 is split into two beams having different polarized components by the polarizing beam splitter 301. That is, an S-polarized beam is reflected by the PBS 301, and a P-polarized beam is transmitted through the PBS 301. The transmitted P-polarized beam is enlarged by a lens 304, and is then projected on the screen 303. On the other hand, the reflected S-polarized beam is reflected by a reflecting member 305, such as a mirror, and is then projected on the screen 303. The two transmitted and reflected beams are converted into the same linearly or circularly polarized beams by modulators 306 and 307.

Meanwhile, the two transmitted and reflected beams have different polarized components. Consequently, it is necessary to convert the two transmitted and reflected beams into identical polarized beams. To this end, a half wave plate 308 is located on a reflected beam path, which extends through the modulator 307, and no half wave plate is located on a transmitted beam path, which extends through the modulator 306, such that the image beams have the same linearly polarized beams (e.g. P-polarized beams) before passing through the modulators 306 and 307 and such that the image beams become circularly polarized beams having the same direction or, depending on the circumstances, linearly polarized beams having the same direction after passing through the modulators 306 and 307.

On the other hand, no half wave plate may be located on the reflected beam path, which extends through the modulator 307, and a half wave plate 309 may be located on the transmitted beam path, which extends through the modulator 306, such that the image beams become the S-polarized beams before passing through the modulators 306 and 307 and such that the image beams become circularly polarized beams having the same direction or, depending on the circumstances, linearly polarized beams having the same direction after passing through the modulators 306 and 307.

Figure 4:
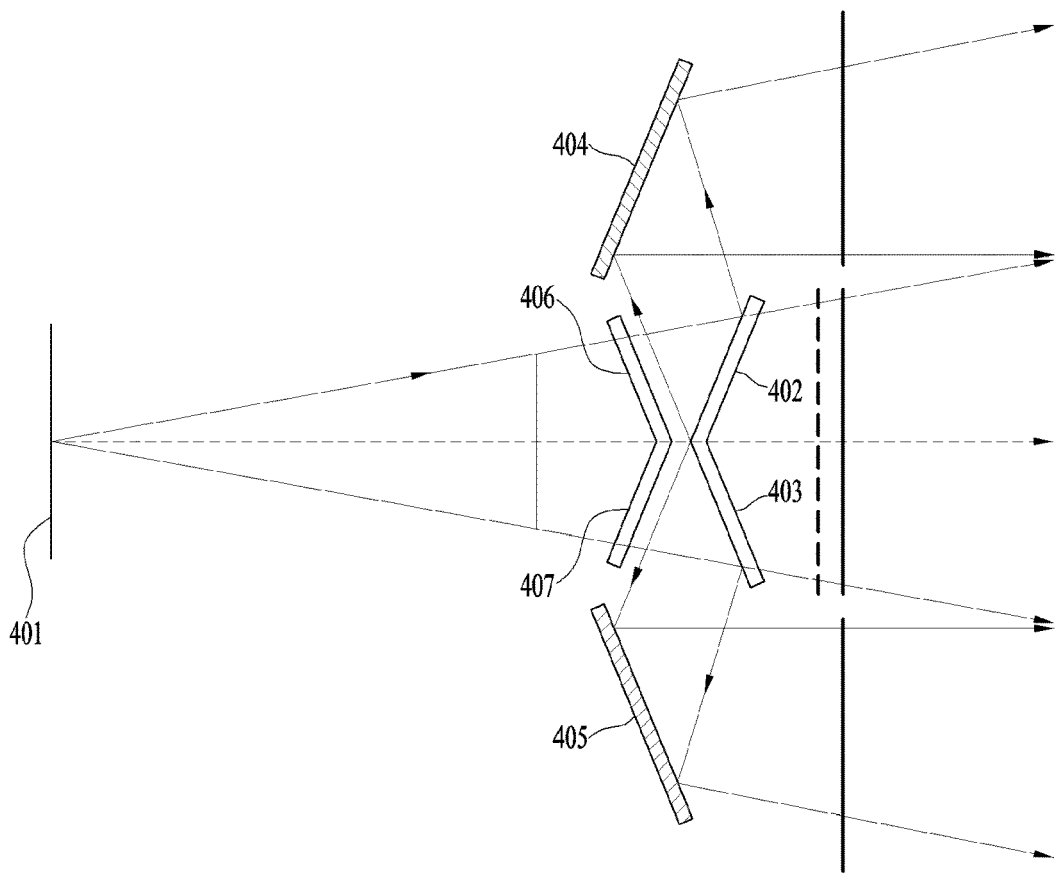
FIG. 4 is a view illustrating another example of a stereoscopic image display apparatus using a plurality of polarizing beam splitters to which the present invention is applicable.

FIG. 4 is a view illustrating another example of a stereoscopic image display apparatus using a plurality of polarizing beam splitters to which the present invention is applicable. Specifically, the stereoscopic image display apparatus shown in FIG. 4 is a triple beam system configured such that image light is split into three beams by the polarizing beam splitters.

Referring to FIG. 4, image light emitted by a projector 401 may be split into a first image beam, which is transmitted through polarizing beam splitters 402 and 403, a second image beam, which is reflected by the polarizing beam splitter 402 and is subsequently reflected by a reflecting member 404, and a third image beam, which is reflected by the polarizing beam splitter 403 and is subsequently reflected by a reflecting member 405. The stereoscopic image display apparatus is characterized in that image light is split into one transmitted beam and two reflected beams based on the polarized components thereof and in that the two reflected beams are formed by dividing the image light into two equal parts. In this system, therefore, the two reflected beams, which are split from each other, may be projected on a screen as a single image.

In the embodiment shown in FIG. 4, the polarizing beam splitters 402 and 403 are disposed such that a predetermined angle is defined between the polarizing beam splitters 402 and 403. In addition, the stereoscopic image display apparatus further includes refracting members 406 and 407 for preventing the image light from being lost when the image light is incident on the connection between the polarizing beam splitters 402 and 403.

Meanwhile, the polarizing beam splitters 402 and 403 shown in FIG. 4 may be configured to have a prism shape in consideration of the difference between a transmitted beam path and a reflected beam path. Of course, the polarizing beam splitters 402 and 403 may be configured to have any of various other shapes.

In the dual beam system (see FIG. 3) and the triple beam system (see FIG. 4) described above, however, the modulators are conceptually shown. As will be described below, each of the modulators is configured to have two liquid crystal layers.

Figure 5:
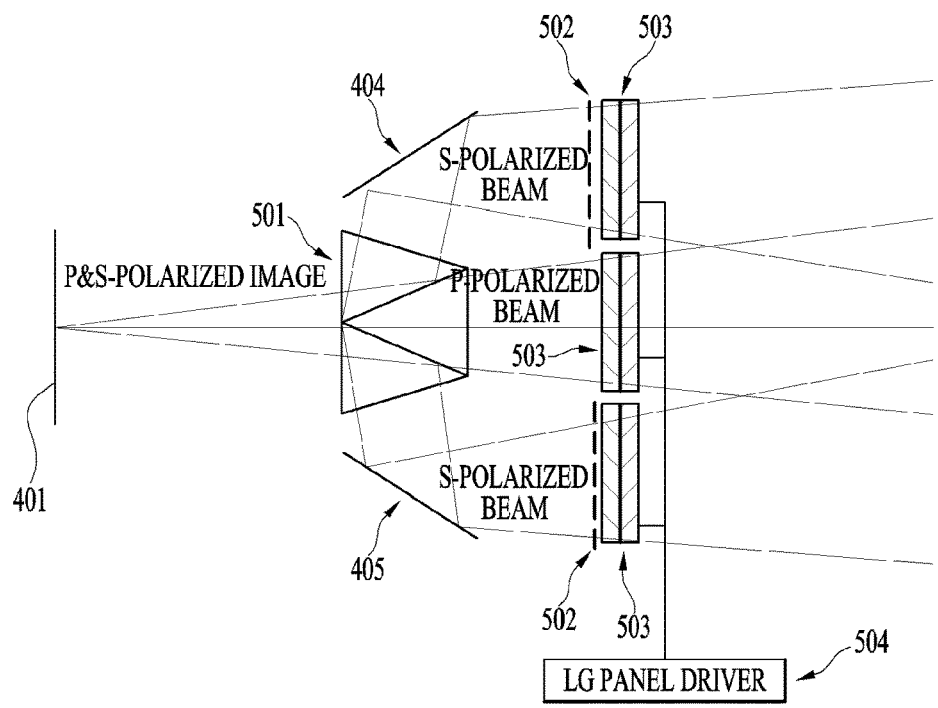
FIG. 5 is a view illustrating a stereoscopic image display apparatus using modulators, each of which has a dual liquid crystal layer.

FIG. 5 is a view illustrating a stereoscopic image display apparatus using modulators, each of which has a dual liquid crystal layer.

The triple beam type stereoscopic image display apparatus shown in FIG. 5 is identical to the triple beam type stereoscopic image display apparatus shown in FIG. 4 except that a prism-shaped polarizing beam splitter 501 is used in place of the polarizing beam splitters 402 and 403 of FIG. 4. In addition, FIG. 5 is a view further illustrating a process after the transmitted beam is transmitted through the polarizing beam splitter 501 and the reflected beams are reflected by the reflecting member 404 and the reflecting member 405 in the system of FIG. 4.

In the example of FIG. 5, a transmitted beam, which is transmitted through the polarizing beam splitter 501, is shown as a P-polarized beam, and reflected beams, which are reflected by the polarizing beam splitter 501, are shown as S-polarized beams. In the example of FIG. 5, half wave plates 502 are shown as being located on reflected beam paths of the reflected beams in order to align the polarizing directions of the transmitted beam and the reflected beams. As a result, all of the transmitted beam and the reflected beams may be converted into P-polarized beams, which may be incident on modulators 503. Of course, as previously described with reference to FIG. 3, a half wave plate 502 may be located on a transmitted beam path of the transmitted beam in order to convert all of the transmitted beam and the reflected beams into S-polarized beams, which may be incident on the modulators 503, instead of the half wave plates 502 being located on the reflected beam paths as shown in FIG. 5.

Meanwhile, the transmitted beam and the reflected beams may be modulated into linearly polarized beams or circularly polarized beams having different polarizing directions through the modulators 503 when a left image and a right image are emitted. For example, an LC panel driver 504 may symmetrically apply driving voltages having different directions to the modulators 503 based on a change in a time period during which a left image is emitted by the projector 401 and a time period during which a right image is emitted by the projector 401 such that the left image is converted into a left circularly polarized beam and the right image is converted into a right circularly polarized beam.

As shown in FIG. 5, each of the modulators 503 is configured to have a dual liquid crystal layer, which also equally applies to the modulators 306 and 307, which are conceptually shown in FIG. 3.

Figure 6:
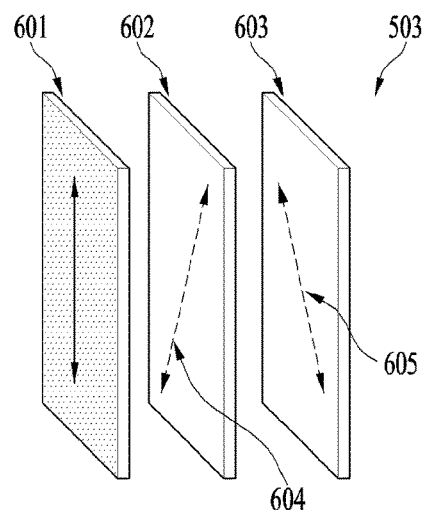
FIG. 6 is a view illustrating the structure of a general modulator that is applied to the stereoscopic image display apparatus described with reference to FIGS. 3 to 5.

FIG. 6 is a view illustrating the structure of a general modulator that is applied to the stereoscopic image display apparatus described with reference to FIGS. 3 to 5.

As shown in FIG. 6, a dual liquid crystal layer type LC panel including a linear polarizer 601, a first liquid crystal layer 602, and a second liquid crystal layer 603 is used as the general modulator that is applied to the stereoscopic image display apparatus described with reference to FIGS. 3 to 5. As a concrete example, in the case in which each of the first liquid crystal layer 602 and the second liquid crystal layer 603 is configured in the form of an optically compensated bend (OCB), the orientation direction 604 of the first liquid crystal layer 602 may be +45 degrees, and the orientation direction 605 of the second liquid crystal layer 603 may be +135 degrees. As described above, the two liquid crystal layers are disposed such that the orientation directions of the liquid crystal layers have a difference of 90 degrees therebetween. After passing through the liquid crystal layers, therefore, a linearly polarized beam may be converted into a left circularly polarized beam or a right circularly polarized beam depending on the driving voltage.

Figure 7:
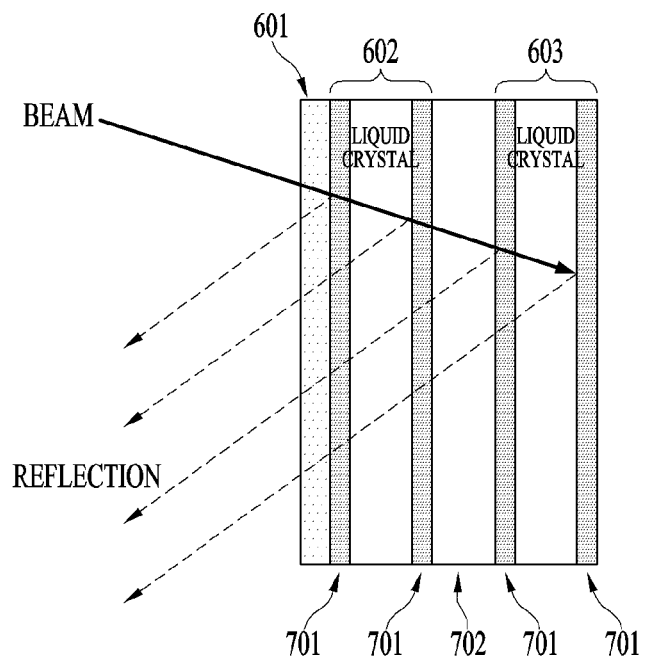
FIG. 7 is a view illustrating drawbacks caused in the case in which a modulator having a dual liquid crystal layer is used.

FIG. 7 is a view illustrating drawbacks occurring in the case in which a modulator having a dual liquid crystal layer is used.

In order to control the first liquid crystal layer 602 and the second liquid crystal layer 603 depending on the driving voltage, transparent electrodes 701 that surround the liquid crystal layers are required, as shown in FIG. 7. Driving voltages having different directions are applied to the transparent electrodes 701 when a left image and a right image are emitted such that the phases of the first liquid crystal layer 602 and the second liquid crystal layer 603 are delayed by ¼ λ in order to generate a left circularly polarized beam or a right circularly polarized beam.

If the transparent electrodes 701 are disposed, however, light may be lost, as shown in FIG. 7. That is, in the example of FIG. 5, when the transmitted beam and the reflected beams, which are P-polarized beams, pass through the modulators, each of which has a dual liquid crystal layer, the beams pass through media having different refractive indices, as shown in FIG. 7. As a result, some of the beams are reflected, whereby light is lost and thus brightness is reduced. In addition, a modulator having such a dual liquid crystal layer has problems in that it is difficult to manufacture the modulator due to optical adhesion 702 and to maintain the modulator, in addition to the reduction of brightness due to the transparent electrode, as described above.

In a preferred embodiment of the present invention, therefore, a stereoscopic image display apparatus that is capable of displaying a high-brightness, high-quality stereoscopic image, which is configured by incorporating a modulator having a single liquid crystal layer into the dual beam type or triple beam type stereoscopic image display apparatus described with reference to FIGS. 3 to 5, is proposed.

Figure 8:
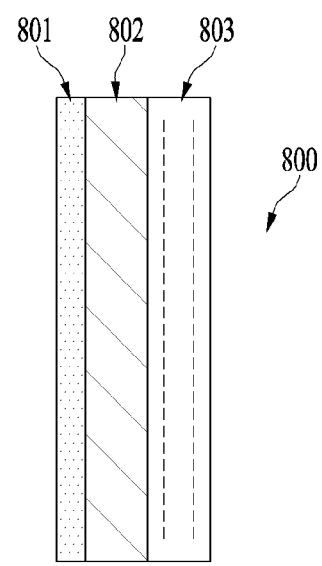
FIGS. 8 and 9 are views illustrating a modulator having a single liquid crystal layer according to an embodiment of the present invention.
Figure 9:
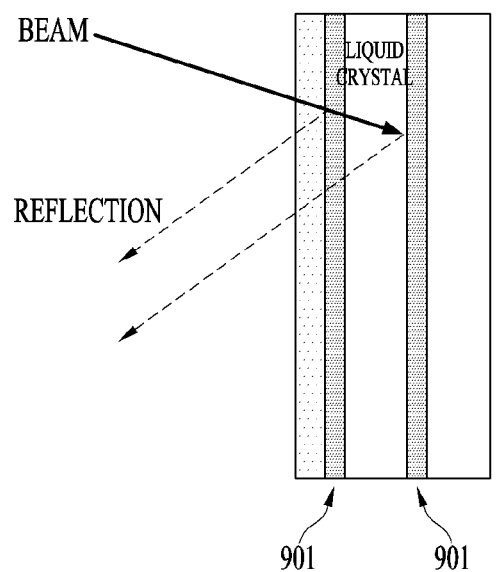

FIGS. 8 and 9 are views illustrating a modulator having a single liquid crystal layer according to an embodiment of the present invention.

As shown in FIGS. 8 and 9, a single liquid crystal layer type modulator 800 according to this embodiment may include a linear polarizer 801, a liquid crystal layer (a liquid crystal cell) 802, and a quarter wave plate 803. In the case in which the liquid crystal layer is configured in the form of an OCB, the liquid crystal layer 802 is disposed such that the difference between the orientation direction of the liquid crystal layer 802 and the orientation direction of the quarter wave plate 803 is 90 degrees. When a linearly polarized beam is transmitted through the liquid crystal layer, therefore, the linearly polarized beam may be modulated into a circularly polarized beam.

In addition, different driving voltages may be applied to the single liquid crystal layer when a left image and a right image are emitted such that a linearly polarized beam is converted into a left circularly polarized beam or a right circularly polarized beam. To this end, transparent electrodes 901 may be disposed so as to surround the liquid crystal layer, as shown in FIG. 9.

It can be seen that, in the case in which a modulator having a single liquid crystal layer is used, as shown in FIG. 9, the loss of light is reduced further than in the case in which a modulator having a dual liquid crystal layer is used, as shown in FIG. 7.

Figure 10:
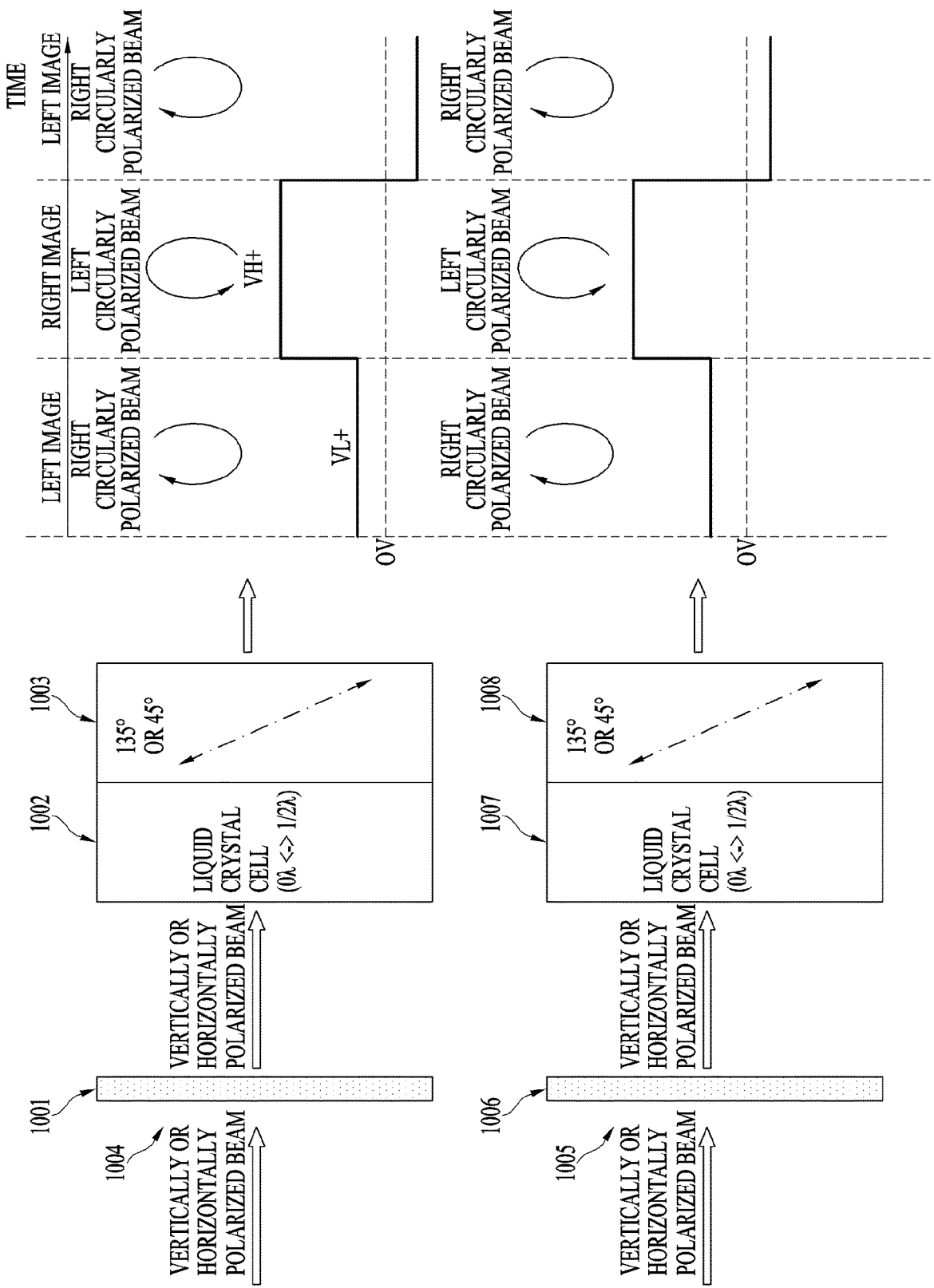
FIG. 10 is a view illustrating the operation of driving a stereoscopic image display apparatus using a modulator having a single liquid crystal layer according to an embodiment of the present invention.

FIG. 10 is a view illustrating the operation of driving a stereoscopic image display apparatus using a modulator having a single liquid crystal layer according to an embodiment of the present invention.

The upper figures of FIG. 10 show processing of an image beam on a transmitted beam path, and the lower figures of FIG. 10 show processing of an image beam on a reflected beam path. Referring first to the lower figures of FIG. 10, the beam on the reflected beam path, which is a horizontally polarized beam, may be converted into a vertically polarized beam, which is identical to the transmitted beam, while passing through a half wave plate 1006. On the other hand, referring to the upper figures, the beam on the transmitted beam path, which is a vertically polarized beam, may be converted into a horizontally polarized beam, which is identical to the reflected beam, while passing through a half wave plate 1001. Linear polarizers may be further provided in front of single liquid crystal layers (liquid crystal cells) 1002 and 1007 in order to clean up the vertically polarized beam or the horizontally polarized beam as needed.

In this embodiment, it is assumed that in the case in which the magnitude of driving voltage is low (VL), each of the single liquid crystal layers (liquid crystal cells) 1002 and 1007 has a phase delay of ½ λ, and in the case in which the magnitude of driving voltage is high (VH), each of the single liquid crystal layers (liquid crystal cells) 1002 and 1007 has a phase delay of 0λ. Meanwhile, each of quarter wave plates 1003 and 1008 may have a slow axis of 135 degrees or 45 degrees. In the example of FIG. 10, it is assumed that both the quarter wave plate 1003 on the transmitted beam path and the quarter wave plate 1008 on the reflected beam path have the same slow axes, i.e. slow axes of 135 degrees or 45 degrees.

When driving voltages having the patterns shown in the right figures of FIG. 10 are applied to modulators 1004 and 1005 of the stereoscopic image display apparatus having the above structure, a left image may be modulated into a right circularly polarized beam when the left image is emitted, and a right image may be modulated into a left circularly polarized beam when the right image is emitted, whereby a stereoscopic image may be realized.

In the case in which modulators each having a single liquid crystal layer are used, it is possible to acquire a higher-brightness stereoscopic image than in the case in which modulators each having a dual liquid crystal layer are used. In addition, the apparatus described with reference to FIG. 10 and the method of driving the apparatus may also equally apply to the dual beam system shown in FIG. 3 as well as the triple beam system shown in FIGS. 4 and 5.

However, the above embodiments may have the following drawbacks.

In a modulator having a single liquid crystal layer, the liquid crystal layer may have a phase delay of 0λ or ½ λ depending on the driving voltage, as described above. If the liquid crystal layer has a phase delay of 0λ, a beam passing through the liquid crystal layer and the quarter wave plate is modulated into a left circularly polarized beam without distortion. If the liquid crystal layer has a phase delay of ½ λ, on the other hand, a beam passing through the liquid crystal layer and the quarter wave plate is modulated into a right circularly polarized beam, the quality of which is somewhat low. As a result, the left image and the right image may not be symmetrical with each other in terms of transmittance, crosstalk, color, etc. Asymmetry between the left image and the right image may impede the use of a modulator having a single liquid crystal layer in a stereoscopic image display apparatus using a polarizing beam splitter.

Asymmetry may also become an issue in the case in which a general modulator is used as well as in the case in which a single liquid crystal layer is used.

Figure 11:
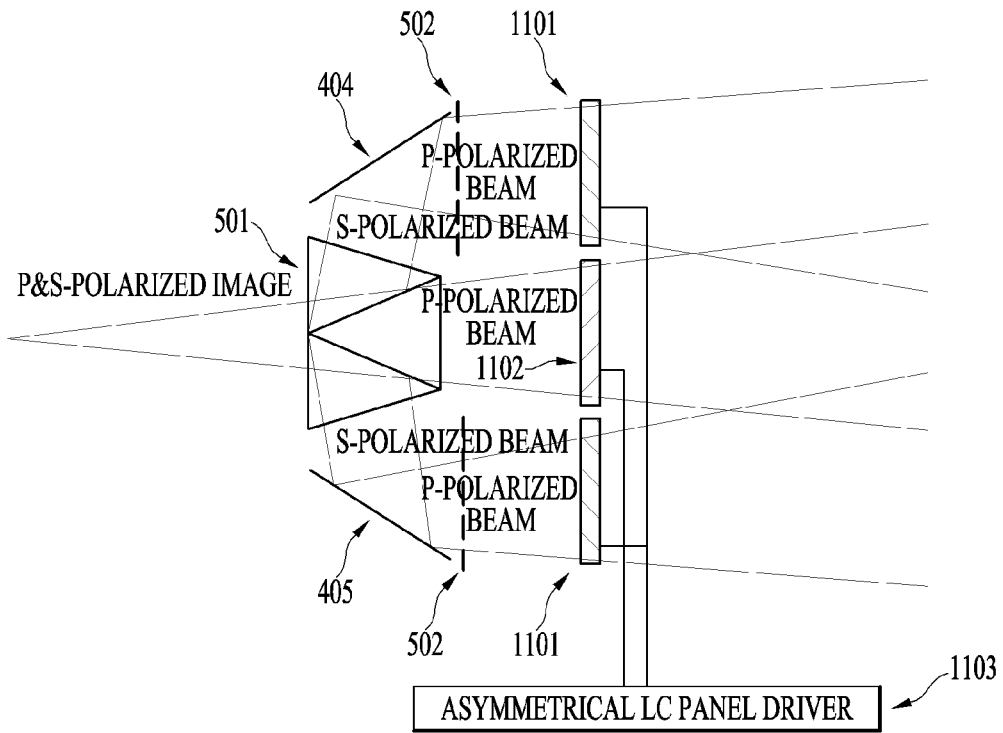
FIG. 11 is a view illustrating a stereoscopic image display apparatus according to another embodiment of the present invention.

FIG. 11 is a view illustrating a stereoscopic image display apparatus according to another embodiment of the present invention. Specifically, referring to FIG. 11, driving voltages of modulators 1101 and 1102 are set to asymmetrically drive the modulator 1102, which is located on a transmitted beam path, and the modulators 1101, which are located on reflected beam paths, using an asymmetrical driver 1103 in order to solve asymmetry between a left image and a right image as described above.

Specifically, in the case in which each of the single liquid crystal type modulators 1101 and 1102 has a phase delay of ½ λ when a voltage having a magnitude of VL is applied to each of the single liquid crystal type modulators 1101 and 1102 and each of the single liquid crystal type modulators 1101 and 1102 has a phase delay of 0λ when a voltage having a magnitude of VH is applied to each of the single liquid crystal type modulators 1101 and 1102, a left circularly polarized beam generated through a phase delay of 0λ in the modulator 1102 on the transmitted beam path and a left circularly polarized beam generated through a phase delay of ½ λ in the modulator 1101 on the reflected beam path overlap on a screen for a left image emitted during a first time period, and a right circularly polarized beam generated through a phase delay of ½ λ in the modulator 1102 on the transmitted beam path and a right circularly polarized beam generated through a phase delay of 0λ in the modulator 1101 on the reflected beam path overlap on the screen for a right image emitted during a second time period.

To this end, in the case in which the magnitude of voltage applied to the modulator 1102 on the transmitted beam path at a specific time is VH, the asymmetrical LC panel driver 1103 may set the magnitude of voltage applied to the modulator 1101 on the reflected beam path to VL and may apply the set voltage to the modulator 1101 on the reflected beam path. On the other hand, in the case in which the magnitude of voltage applied to the modulator 1102 on the transmitted beam path at a specific time is VL, the asymmetrical LC panel driver 1103 may set the magnitude of voltage applied to the modulator 1101 on the reflected beam path to VH and may apply the set voltage to the modulator 1101 on the reflected beam path.

Figure 12:
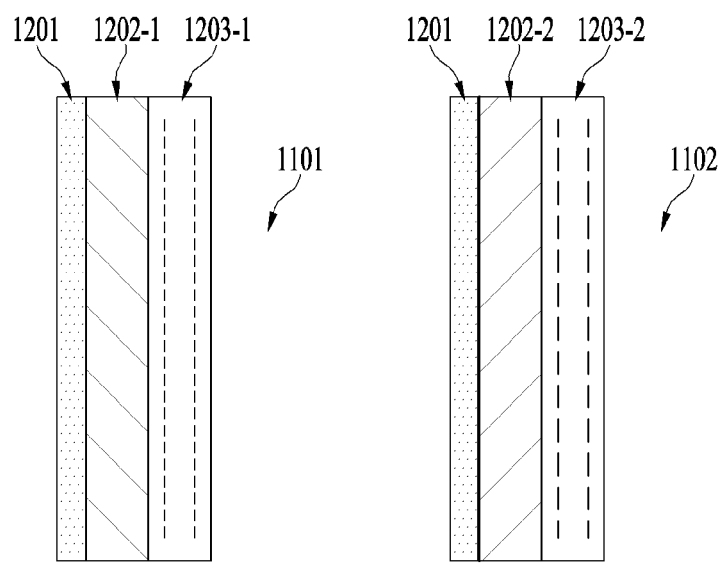
FIG. 12 is a view illustrating the structure of modulators in the case in which a stereoscopic image is displayed using asymmetric driving voltage as shown in FIG. 11.

As shown in FIG. 11, asymmetric driving voltage may be applied due to a difference in structure between the modulator 1102 on the transmitted beam path and the modulator 1101 on the reflected beam path. FIG. 12 is a view illustrating the structure of modulators in the case in which a stereoscopic image is displayed as described above.

Referring to FIG. 12, the modulator 1101 on the reflected beam path and the modulator 1102 on the transmitted beam path are identical to each other in that each of the modulators includes a linear polarizer 1201, a single liquid crystal layer 1202-1 or 1202-2, and a quarter wave plate 1203-1 or 1203-2. In this embodiment, however, the slow axis of the quarter wave plate 1203-1 on the reflected beam path and the slow axis of the quarter wave plate 1203-2 on the transmitted beam path may be disposed so as to have a difference of 90 degrees therebetween. For example, in the case in which the slow axis of the quarter wave plate 1203-1 on the reflected beam path is 135 degrees, the slow axis of the quarter wave plate 1203-2 on the transmitted beam path may be 45 degrees. Alternatively, in the case in which the slow axis of the quarter wave plate 1203-1 on the reflected beam path is 45 degrees, the slow axis of the quarter wave plate 1203-2 on the transmitted beam path may be 135 degrees.

Also, in the case in which each of the single liquid crystal layers 1202-1 and 1202-2 is configured in the form of an OCB, the orientation direction of the liquid crystal layer 1202-2 on the transmitted beam path may be set to 45 degrees, and the slow axis of the quarter wave plate 1203-2 may be set to 135 degrees. In this case, the orientation direction of the liquid crystal layer 1202-1 on the reflected beam path may be set to 135 degrees, and the slow axis of the quarter wave plate 1203-1 may be set to 45 degrees. However, in the case in which each of the liquid crystal layers 1202-1 and 1202-2 is constituted by a TN LC panel, the TN LC panel is configured to have orientation directions of 0 degrees and 90 degrees. Consequently, there is no necessity for the liquid crystal layers to be limited to the above embodiment.

Figure 13:
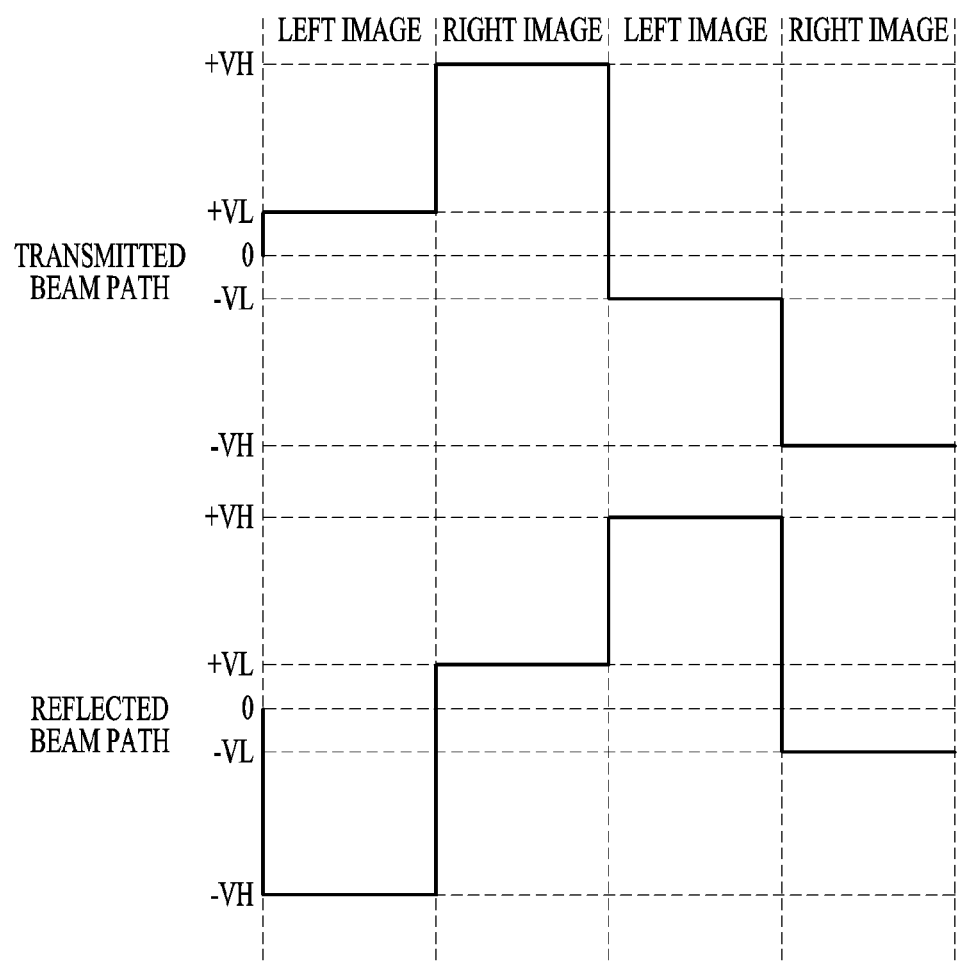
FIG. 13 is a view illustrating the patterns of driving voltages that are applied to a modulator on a transmitted beam path and a modulator on a reflected beam path in the stereoscopic image display apparatus shown in FIG. 11.

FIG. 13 is a view illustrating the patterns of driving voltages that are applied to the modulator 1102 on the transmitted beam path and the modulator 1101 on the reflected beam path in the stereoscopic image display apparatus shown in FIG. 11.

In the case in which a voltage having a magnitude of VH is applied to one selected from between the modulator on the transmitted beam path and the modulator on the reflected beam path at a specific time in this embodiment, as described above, the asymmetrical driver applies a voltage having a magnitude of VL to the other selected from between the modulator on the transmitted beam path and the modulator on the reflected beam path at the same time. That is, the asymmetrical driver applies voltages asymmetrically. FIG. 13 shows an example of the patterns of driving voltages that are optimized in consideration of the above matters. However, the present invention is not limited to the patterns of driving voltages shown in FIG. 13 as long as the above-described features are maintained.

Figure 14:
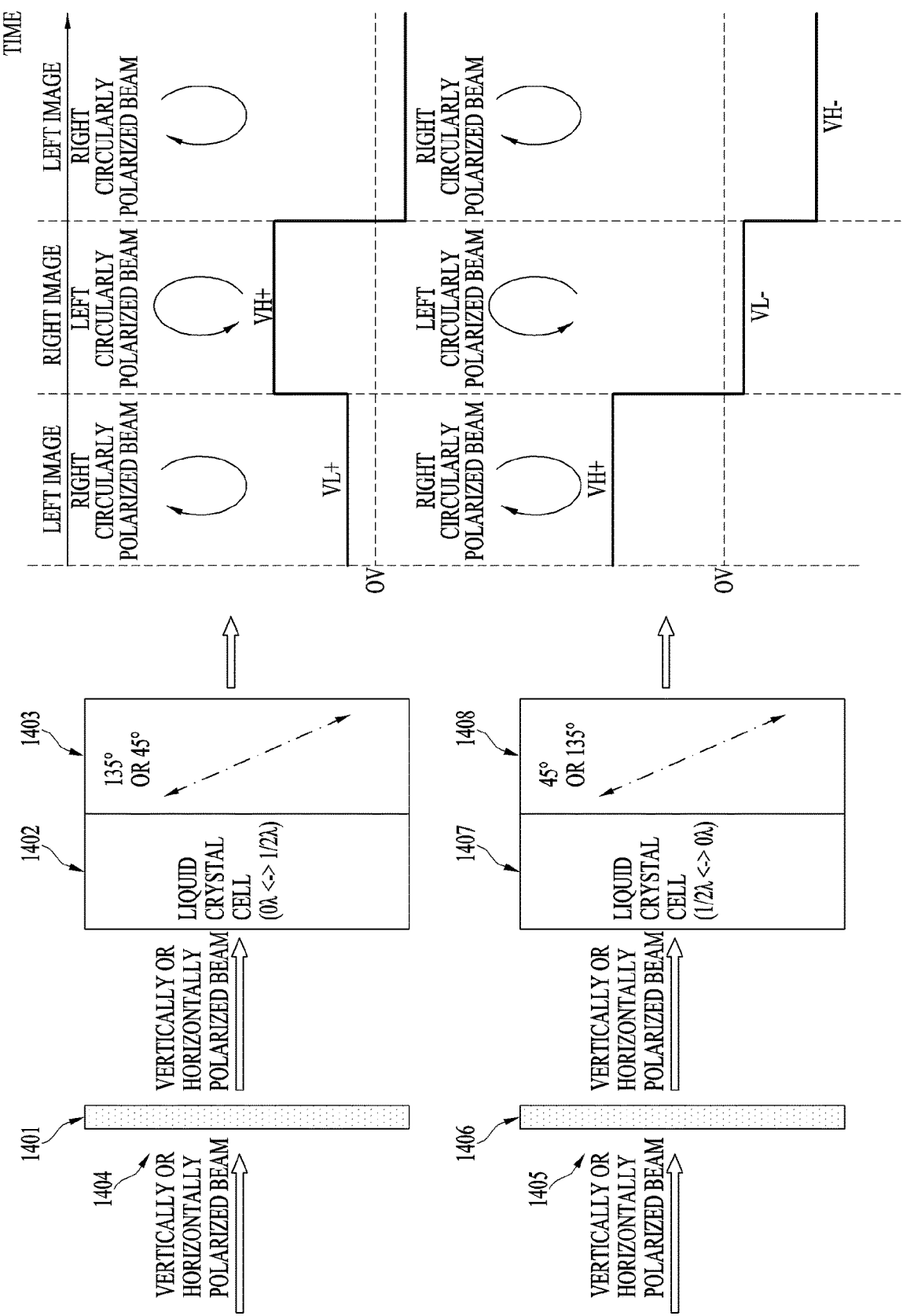
FIG. 14 is a view illustrating the driving mechanism of the stereoscopic image display apparatus shown in FIG. 11.

FIG. 14 is a view illustrating the driving mechanism of the stereoscopic image display apparatus shown in FIG. 11.

In the state in which both a transmitted beam and a reflected beam are converted into vertically polarized beams or horizontally polarized beams through a half wave plate 1401 or 1406, a driving voltage of VL+ may be applied to a modulator 1404 on a transmitted beam path and a driving voltage of VH+ may be applied to a modulator 1405 on a reflected beam path at a specific time (for example, when a left image is emitted). Linear polarizers may be further provided in front of single liquid crystal layers (liquid crystal cells) 1402 and 1407 in order to clean up the vertically polarized beams or the horizontally polarized beams as needed. In this case, the liquid crystal layer 1402 of the modulator 1404 on the transmitted beam path may have a phase delay of ½ λ, and the liquid crystal layer 1407 of the modulator 1405 on the reflected beam path may have a phase delay of 0λ. Since the slow axis of a quarter wave plate 1403 of the modulator 1404 on the transmitted beam path and the slow axis of a quarter wave plate 1408 of the modulator 1405 on the reflected beam path are configured so as to have a difference of 90 degrees therebetween, however, both the transmitted beam and the reflected beam may be modulated into the same circularly polarized beams having one direction, selected from between left circularly polarized beams and right circularly polarized beams, (for example, right circularly polarized beams), at a specific time.

In the case in which one selected from between the transmitted beam and the reflected beam is converted into a left image by a phase delay of 0λ, the other selected from between the transmitted beam and the reflected beam is converted into a right image by a phase delay of ½ λ, and the left images overlap on a screen at a specific time, as described above, it is possible to effectively prevent the reduction in quality of a stereoscopic image due to asymmetry in which only one selected from between the left image and the right image is an image having a phase delay of ½ λ, as described above, whereby it is possible to provide a high-brightness, high-quality stereoscopic image.

In the preferred embodiment of the present invention described above, it is possible to acquire a high-brightness stereoscopic image using single liquid crystal type modulators and at the same time to enable the left image and the right image to be symmetrical with each other in terms of transmittance, crosstalk, color, etc. through asymmetrical driving of the modulators.

Figure 15:
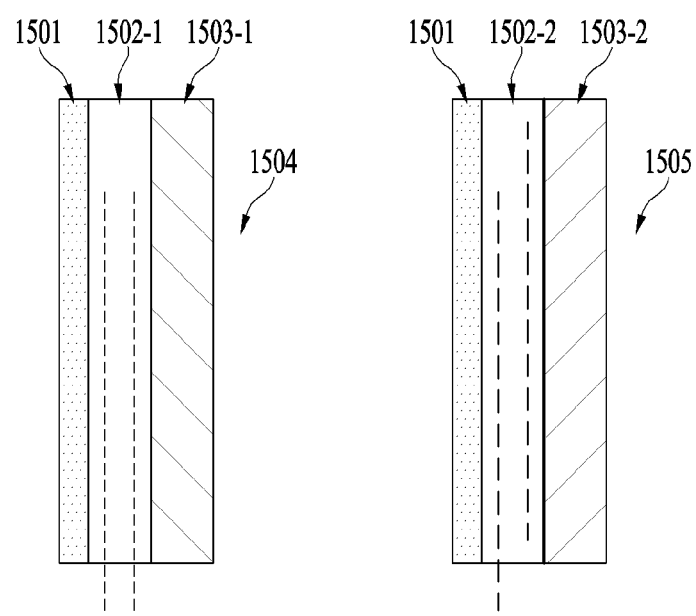
FIGS. 15 and 16 are views illustrating single liquid crystal type modulators according to another embodiment of the present invention.
Figure 16:
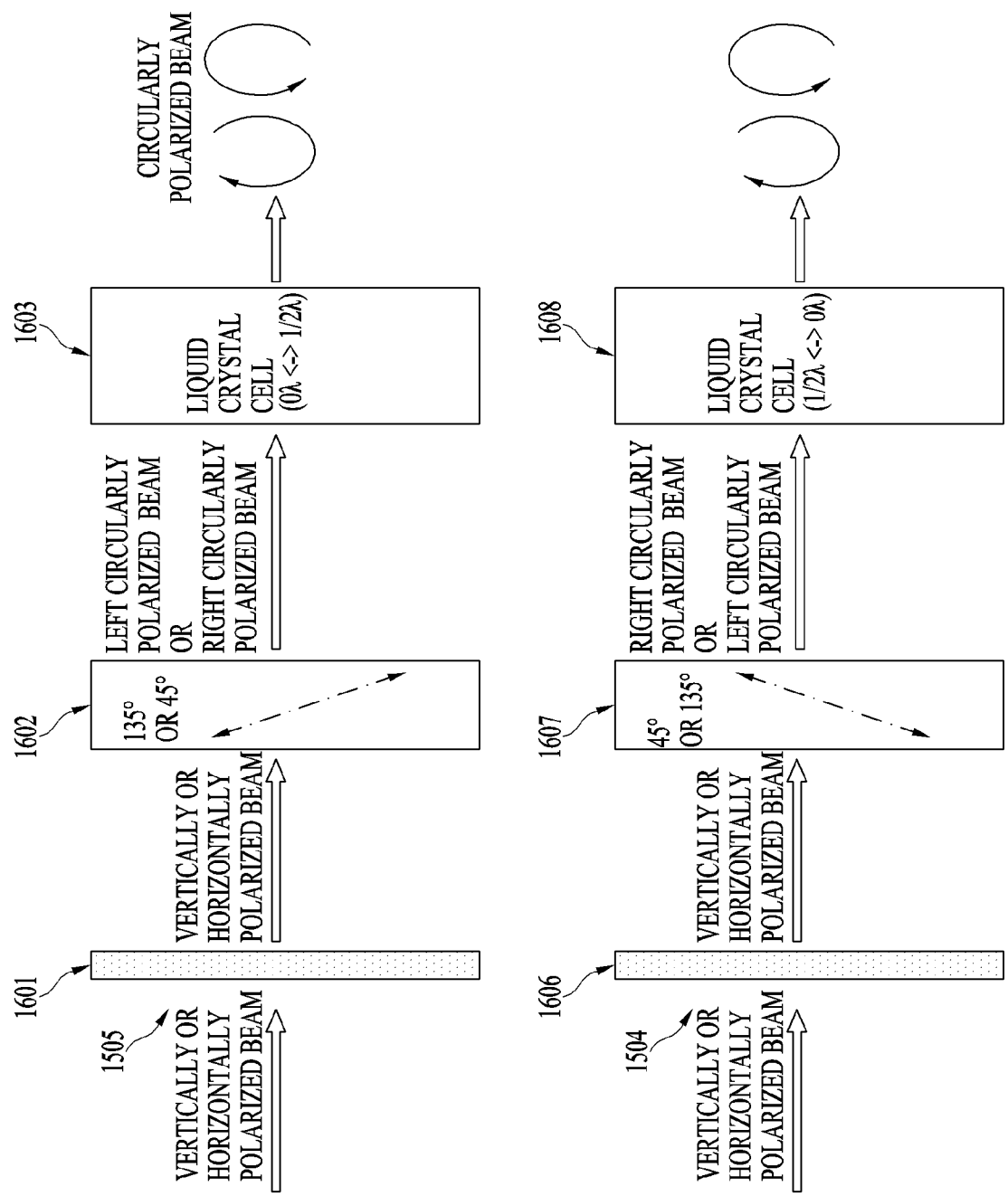

FIGS. 15 and 16 are views illustrating single liquid crystal type modulators according to another embodiment of the present invention.

As shown in FIG. 12, each of the single liquid crystal type modulators 1101 and 1102 may be configured such that the linear polarizer 1201, the single liquid crystal layer 1202-1 or 1202-2, and the quarter wave plate 1203-1 or 1203-2 are sequentially arranged. Alternatively, as shown in FIG. 15, each of the single liquid crystal type modulators may be configured such that a linear polarizer 1501, a quarter wave plate 1502-1 or 1502-2, and a liquid crystal cell 1503-1 or 1503-2 are sequentially arranged. The operation using the single liquid crystal type modulators will be described with reference to FIG. 16.

A transmitted beam and a reflected beam having the same vertical direction or the same horizontal direction pass through quarter wave plates 1602 and 1607 of modulators 1504 and 1501 on a transmitted beam path and a reflected beam path. As a result, the transmitted beam is converted into a left circularly polarized beam, and the reflected beam is converted into a right circularly polarized beam. As shown in FIG. 16, the quarter wave plate 1602 of the modulator 1505 on the transmitted beam path may be set so as to have a slow axis of 135 degrees, and the quarter wave plate 1607 of the modulator 1504 on the reflected beam path may be set so as to have a slow axis of 45 degrees. Alternatively, the quarter wave plate 1602 of the modulator 1505 on the transmitted beam path may be set so as to have a slow axis of 45 degrees, and the quarter wave plate 1607 of the modulator 1504 on the reflected beam path may be set so as to have a slow axis of 135 degrees such that the slow axes of the quarter wave plates have a difference of 90 degrees therebetween.

Meanwhile, in this embodiment, voltages having different magnitudes of VH and VL may be applied to the modulator 1505 on the transmitted beam path and the modulator 1504 on the reflected beam path at a specific time. When a voltage having a magnitude of VH is applied at a specific time, therefore, a transmitted beam liquid crystal cell 1603 has a phase delay of 0λ, with the result that the left circularly polarized beam is maintained. On the other hand, when a voltage having a magnitude of VL is applied, a reflected beam liquid crystal cell 1608 has a phase delay of ½ λ, with the result that the right circularly polarized beam may be reconverted into a left circularly polarized beam.

Consequently, the transmitted beam and the reflected beam are converted into circularly polarized beams having the same direction at a specific time, whereby overlapping images may be projected on the screen.

Hereinafter, a method of realizing the stereoscopic image display apparatus without half wave plates in accordance with another aspect of the present invention will be described.

In the conventional stereoscopic image display apparatus using the polarizing beam splitter described above, a reflected beam reflected by the polarizing beam splitter and a transmitted beam transmitted through the polarizing beam splitter have linearly polarized beams that are perpendicular to each other (for example, a P-polarized beam and an S-polarized beam). For this reason, a half wave plate (½ λ retarder) must be provided on any one selected from between the transmitted beam path and the reflected beam path such that the linearly polarized beams have the same direction. In the case in which the principle whereby the modulators are driven asymmetrically is used, however, the conventional half wave plate may be omitted in order to further improve brightness.

Figure 17:
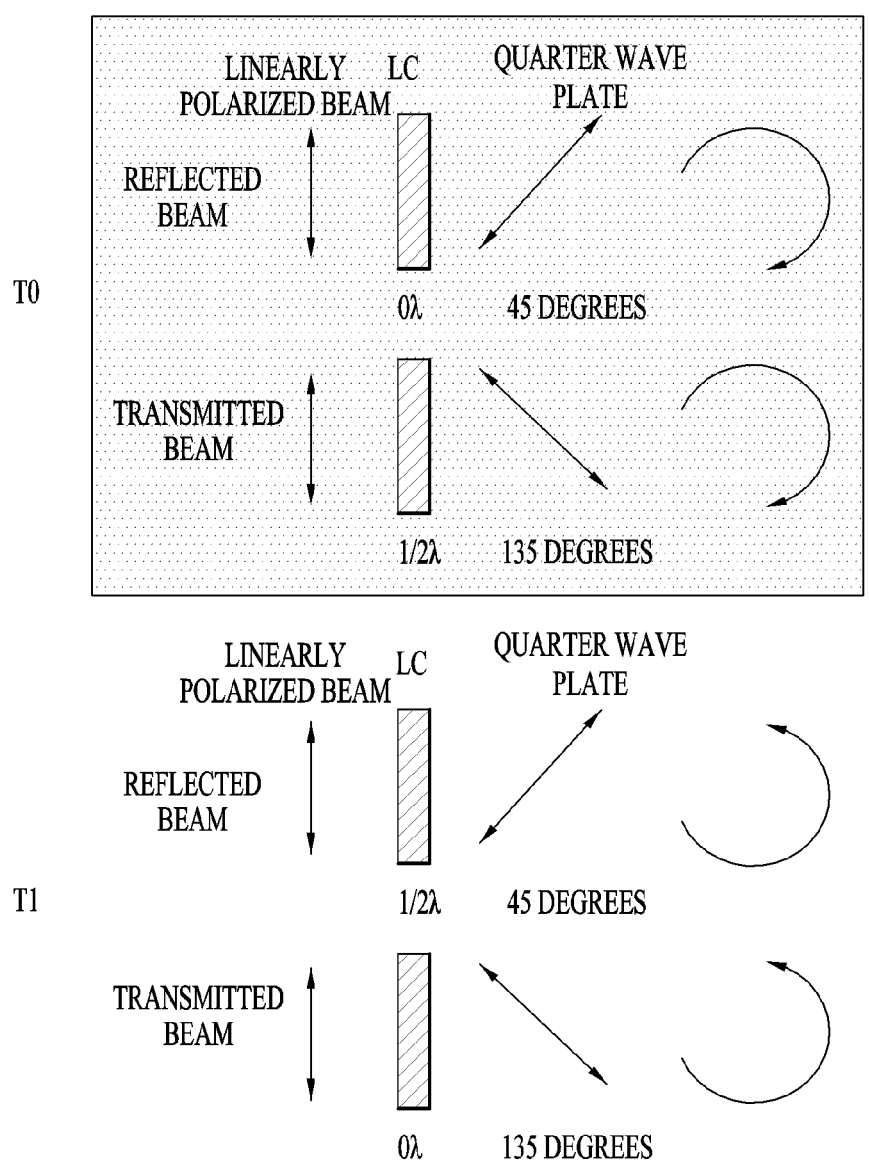
FIGS. 17 and 18 are views illustrating a method of driving a stereoscopic image display apparatus depending on whether or not half wave plates are provided in accordance with an embodiment of the present invention.
Figure 18:
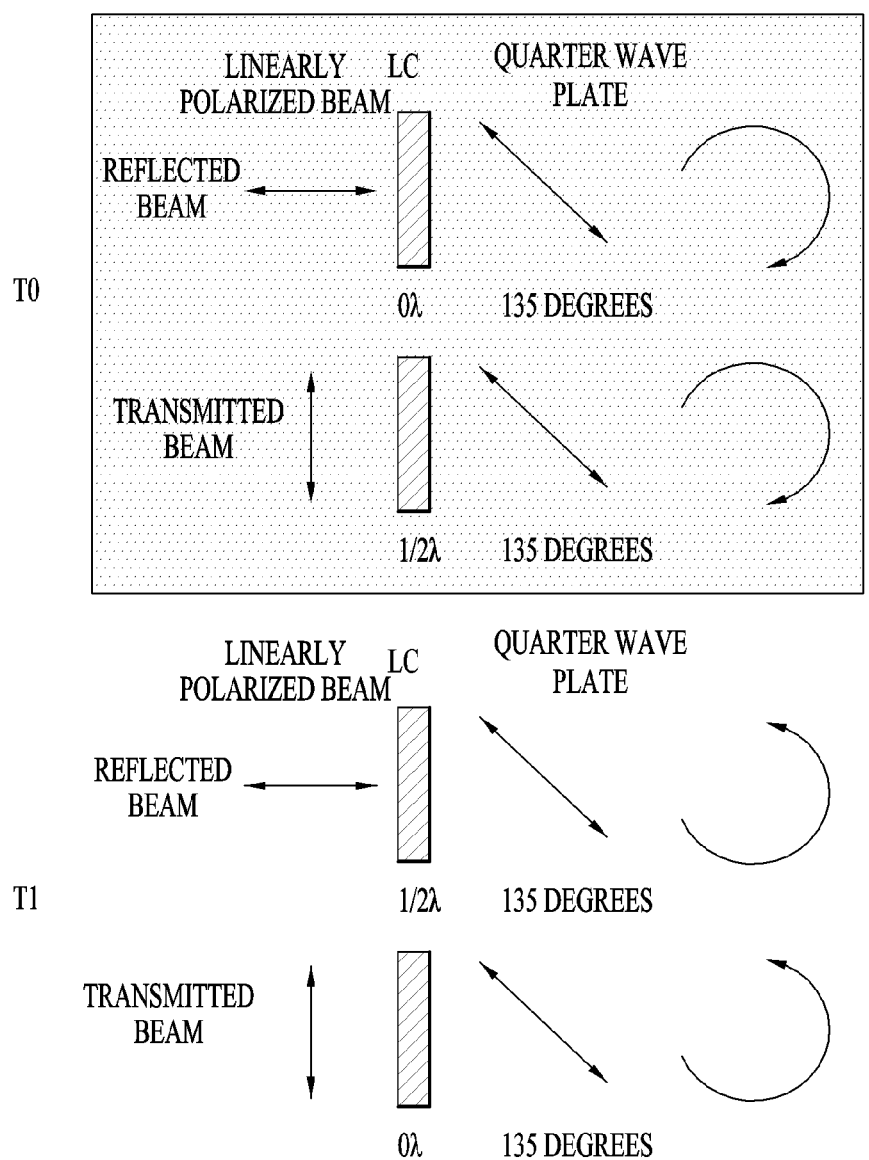

FIGS. 17 and 18 are views illustrating a method of driving a stereoscopic image display apparatus depending on whether or not half wave plates are provided in accordance with an embodiment of the present invention.

Specifically, FIG. 17 shows the operation of the apparatus based on asymmetrical driving of modulators in the case in which the half wave plates are used as described with reference to FIG. 14, and FIG. 18 shows a method of displaying a stereoscopic image through asymmetrical driving of the modulators without the half wave plates.

In the case in which the half wave plates are used, as shown in FIG. 17, both a beam on a transmitted beam path and a beam on a reflected beam path may be incident on modulators as linearly polarized beams having the same direction. FIG. 17 shows that both the transmitted beam and the reflected beam are incident on the modulators as linearly polarized beams having the vertical direction by way of example.

As described above with reference to FIG. 14, the slow axis of the quarter wave plate on the transmitted beam path and the slow axis of the quarter wave plate on the reflected beam path may be configured so as to have a difference of 90 degrees therebetween. In FIG. 17, the slow axis of the quarter wave plate on the transmitted beam path is, for example, 135 degrees, and the slow axis of the quarter wave plate on the reflected beam path is, for example, 45 degrees.

In addition, during a first time period T0, the LC panel of the modulator on the reflected beam path may be driven so as to have a phase delay of 0λ, and the LC panel of the modulator on the transmitted beam path may be driven so as to have a phase delay of ½ λ. In contrast, during a second time period T1, the LC panel of the modulator on the reflected beam path may be driven so as to have a phase delay of ½ λ, and the LC panel of the modulator on the transmitted beam path may be driven so as to have a phase delay of 0λ. As the result of asymmetrical driving described above, as shown in FIG. 17, both the transmitted beam and the reflected beam may be modulated into right circularly polarized beams during the first time period T0, and both the transmitted beam and the reflected beam may be modulated into left circularly polarized beams during the second time period T1.

In the case in which the asymmetrical driving principle is used as described above, both the quarter wave plate on the transmitted beam path and the quarter wave plate on the reflected beam path may have the same slow axes, as shown in FIG. 18. As a result, it is possible to realize a stereoscopic image while omitting a conventional half wave plate.

Specifically, FIG. 18 shows the case in which the transmitted beam and the reflected beam are incident on the modulators as linearly polarized beams having directions perpendicular to each other without using a half wave plate for aligning the directions of the linearly polarized beams such that the linearly polarized beams have the same direction.

In a method of driving the modulators during the first time period T0 and the second time period T1, FIG. 18 is identical to FIG. 17 except that the slow axis of the quarter wave plate of the modulator on the transmitted beam path and the slow axis of the quarter wave plate of the modulator on the reflected beam path are aligned with each other, unlike FIG. 17. In the case in which the slow axis of each modulator is changed as described above, both the transmitted beam and the reflected beam may be modulated into circularly polarized beams having the same direction during each time interval irrespective of the directions of the linearly polarized beams incident on the modulators.

Figure 19:
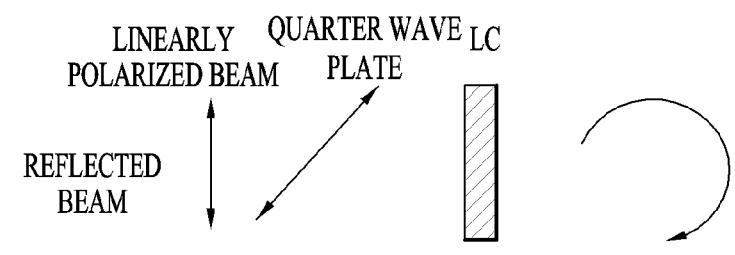
FIGS. 19 and 20 are views illustrating a method of driving a stereoscopic image display apparatus depending on whether or not half wave plates are provided in accordance with another embodiment of the present invention.
Figure 19:
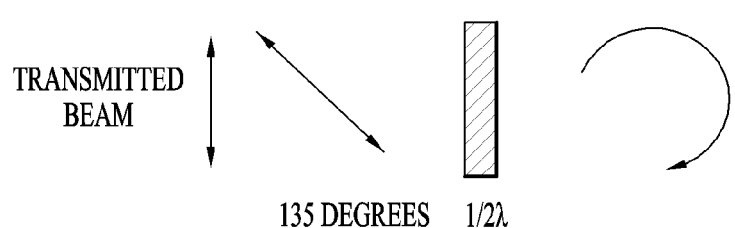
Figure 19:
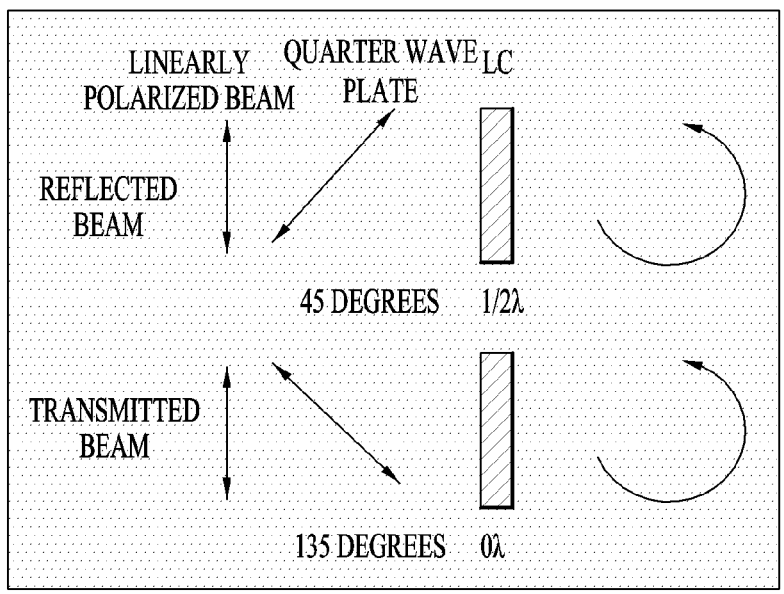
Figure 20:
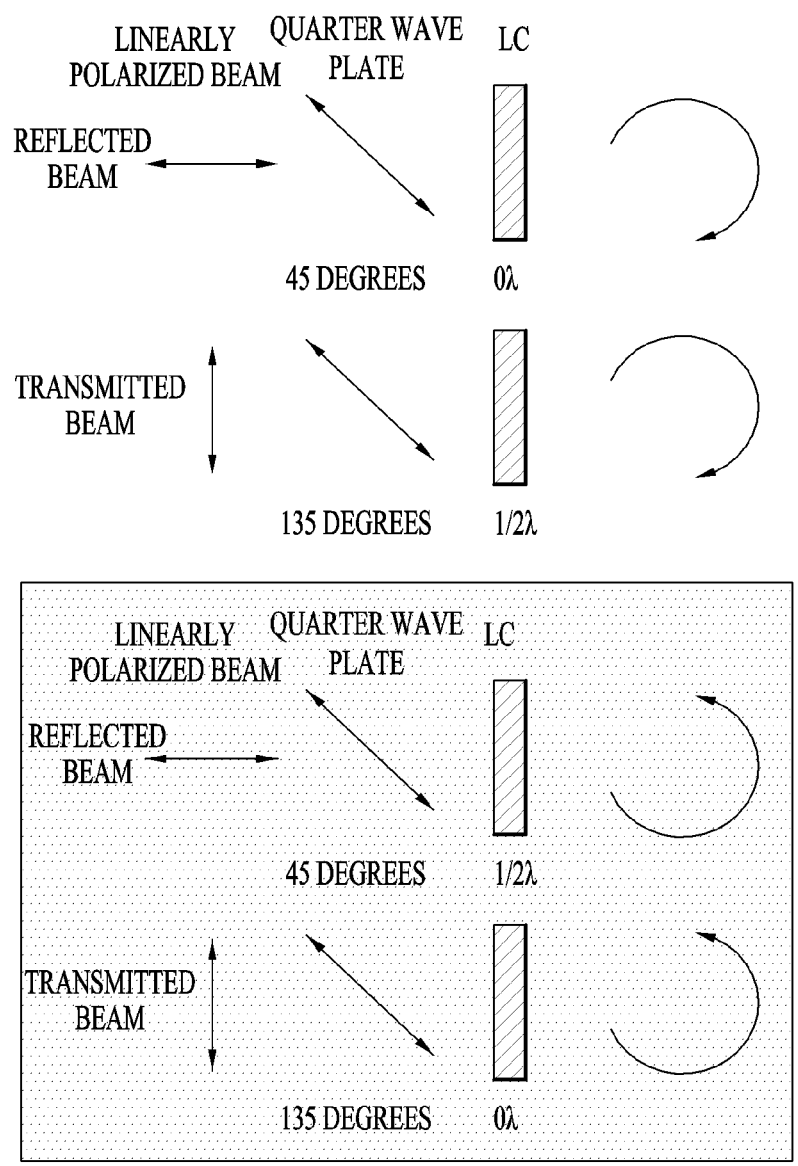

FIGS. 19 and 20 are views illustrating a method of driving a stereoscopic image display apparatus depending on whether or not half wave plates are provided in accordance with another embodiment of the present invention.

Specifically, FIG. 19 shows the operation of the apparatus configured such that the positions of a quarter wave plate and an LC panel of each modulator are changed in the case in which the half wave plates are used, as described with reference to FIGS. 15 and 16, and FIG. 20 shows a method of realizing a stereoscopic image display apparatus without the half wave plates under the same conditions.

In FIG. 19, the order in which the LC panel and the quarter wave plate are disposed in each of the modulator on the transmitted beam path and the modulator on the reflected beam path is reverse to the order in which the LC panel and the quarter wave plate are disposed in each of the modulator on the transmitted beam path and the modulator on the reflected beam path shown in FIG. 17. However, FIG. 19 is identical to FIG. 17 in that when the transmitted beam and the reflected beam are incident as linearly polarized beams having the same direction using the half wave plates, the slow axis of the quarter wave plate of the modulator on the transmitted beam path and the slow axis of the quarter wave plate of the modulator on the reflected beam path are configured so as to have a difference of 90 degrees therebetween.

Referring to FIG. 19, in the case in which, during a first time period T0, the LC panel of the modulator on the transmitted beam path is driven so as to have a phase delay of ½ λ and the LC panel of the modulator on the reflected beam path is driven so as to have a phase delay of 0λ, both the transmitted beam and the reflected beam may be modulated into right circularly polarized beams, as shown in FIG. 19. Also, in the case in which, during a second time period T1, the LC panel of the modulator on the transmitted beam path is driven so as to have a phase delay of 0λ and the LC panel of the modulator on the reflected beam path is driven so as to have a phase delay of ½ λ, both the transmitted beam and the reflected beam may be modulated into left circularly polarized beams, as shown in FIG. 19.

FIG. 20 shows the case in which no half wave plates are used, unlike FIG. 19. In this case, therefore, the transmitted beam and the reflected beam incident on the modulators are linearly polarized beams having directions perpendicular to each other. Even in FIG. 20, the quarter wave plate of the modulator on the transmitted beam path and the quarter wave plate of the modulator on the reflected beam path may have the same slow axes in the case in which no half wave plates are used, as described with reference to FIG. 18.

In the case in which the quarter wave plate of the modulator on the transmitted beam path and the quarter wave plate of the modulator on the reflected beam path have the same slow axes, both the transmitted beam and the reflected beam may be converted into circularly polarized beams having opposite directions after passing through the quarter wave plates at a specific time, as shown in FIG. 20. In this embodiment, however, the LC panels of the modulators are driven so as to have a difference in phase delay of ½ λ at a specific time. Consequently, the transmitted beam and the reflected beam may be modulated into circularly polarized beams having the same direction after passing through the modulators.

Meanwhile, even in the case in which no half wave plates are used, the orientation directions of the LC panels of the modulators and the slow axes of the quarter wave plate may have a difference of 90 degrees therebetween, in the same manner as the case in which the half wave plates are used as described above. In the case in which no half wave plates are used, however, the slow axis of the modulator on the transmitted beam path and the slow axis of the modulator on the reflected beam path are aligned with each other. Consequently, the liquid crystal orientation direction of the LC panel of the modulator on the transmitted beam path and the liquid crystal orientation direction of the LC panel of the modulator on the reflected beam path may be aligned with each other.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

As described above, the present invention is widely applicable to homes and offices as well as movie theaters in which it is necessary to display a stereoscopic image, left and right images of which have symmetrical qualities with high brightness.

The invention claimed is:

1. A stereoscopic image display apparatus comprising:
a polarizing beam splitter for spatially splitting image light emitted by a projector into at least one transmitted beam and at least one reflected beam based on polarized components;
a first modulator for modulating the transmitted beam so as to have different polarizations according to the transmitted beam alternating between a left image and a right image in time division fashion; and
a second modulator for modulating the reflected beam so as to have different polarizations according to the reflected beam alternating between the left image and the right image in time division fashion,
wherein the first modulator and the second modulator are set such that, at a specific time, a phase delay of the first modulator is one of 0λ, and ½λ, and a phase delay of the second modulator is the other one of 0λ, and ½λ, whereby a circularly polarized beam modulated through a phase delay of 0λ, and a circularly polarized beam modulated through a phase delay of ½λ, are combined with each other at the specific time.

2. The apparatus according to claim 1, wherein the stereoscopic image display apparatus uses no half wave plates.

3. The apparatus according to claim 1, wherein each of the first modulator and the second modulator is configured to have a single liquid crystal layer.

4. The apparatus according to claim 1, wherein each of the first modulator and the second modulator comprises a single liquid crystal layer and a quarter wave plate.

5. The apparatus according to claim 1, wherein the stereoscopic image display apparatus uses no half wave plates, and
wherein a first slow axis of a quarter wave plate of the first modulator and a second slow axis of a quarter wave plate of the second modulator are disposed in a same direction.

6. The apparatus according to claim 1, wherein the stereoscopic image display apparatus uses half wave plates, and
wherein a first slow axis of a quarter wave plate of the first modulator and a second slow axis of a quarter wave plate of the second modulator are configured so as to have a difference of 90 degrees therebetween.

7. The apparatus according to claim 1, wherein each of the first modulator and the second modulator has a structure in which a single liquid crystal layer and a quarter wave plate are sequentially disposed in a direction in which light is incident.

8. The apparatus according to claim 1, wherein each of the first modulator and the second modulator has a structure in which a quarter wave plate and a single liquid crystal layer are sequentially disposed in a direction in which light is incident.

9. The apparatus according to claim 1, wherein:
when voltage having a first magnitude (hereinafter, referred to as 'VH') is applied to each of the first modulator and the second modulator, each of the first modulator and the second modulator has a phase delay of $0\lambda$, and when voltage having a second magnitude (hereinafter, referred to as 'VL') is applied to each of the first modulator and the second modulator, each of the first modulator and the second modulator has a phase delay of $\frac{1}{2}\lambda$,
a first voltage pattern, in which +VL, +VH, −VL, and VH are repeated, is applied to the first modulator, and
a second voltage pattern, in which −VH, +VL, +VH, and VL are repeated, is applied to the second modulator at a time corresponding to the first voltage pattern.

10. The apparatus according to claim 1, wherein one of the first modulator and the second modulator is configured to emit a right circularly polarized beam modulated through a phase delay of $0\lambda$ during a first time period, and
wherein the other of the first modulator and the second modulator is configured to emit a right circularly polarized beam modulated through a phase delay of $\frac{1}{2}\lambda$ during the first time period.

11. The apparatus according to claim 10, wherein one of the first modulator and the second modulator is configured to emit a left circularly polarized beam modulated through a phase delay of $\frac{1}{2}\lambda$ during a second time period, which follows the first time period, and
wherein the other of the first modulator and the second modulator is configured to emit a left circularly polarized beam modulated through a phase delay of $0\lambda$ during the second time period.

12. The apparatus according to claim 11, wherein each of the right circularly polarized beam and the left circularly polarized beam corresponds to any one selected from between the left image and the right image.

13. The apparatus according to claim 1, wherein the stereoscopic image display apparatus further uses half wave plates, and
wherein a first orientation direction of a single liquid crystal layer of the first modulator and a second orientation direction of a single liquid crystal layer of the second modulator are configured so as to have a difference of 90 degrees therebetween.

14. The apparatus according to claim 1, wherein each of the first modulator and the second modulator is configured to have a single liquid crystal layer,
wherein the single liquid crystal layer of the first modulator and the single liquid crystal layer of the second modulator are configured in a form of an optically compensated bend (OCB), and
wherein a first slow axis of a quarter wave plate of the first modulator and a first orientation direction of the single liquid crystal layer of the first modulator and a second slow axis of a quarter wave plate of the second modulator and a second orientation direction of the single liquid crystal layer of the second modulator are configured so as to have a difference of 90 degrees therebetween.

15. A stereoscopic image display apparatus comprising:
a polarizing beam splitter for spatially splitting image light emitted by a projector into at least one transmitted beam and at least one reflected beam based on polarized components;
a first modulator having a single liquid crystal layer, the first modulator being configured to modulate the transmitted beam into a first circularly polarized beam, which is one selected from between a left circularly polarized beam and a right circularly polarized beam modulated through a phase delay of $0\lambda$, during a first time period and to modulate the transmitted beam into a second circularly polarized beam, which is the other selected from between the left circularly polarized beam and the right circularly polarized beam modulated through a phase delay of $\frac{1}{2}\lambda$, during a second time period, which follows the first time period; and
a second modulator having a single liquid crystal layer, the second modulator being configured to modulate the reflected beam into the first circularly polarized beam modulated through a phase delay of $\frac{1}{2}\lambda$ during the first time period and to modulate the reflected beam into the second circularly polarized beam modulated through a phase delay of $0\lambda$ during the second time period.

16. The apparatus according to claim 15, wherein the stereoscopic image display apparatus uses no half wave plates, whereby the transmitted beam incident on the first modulator and the reflected beam incident on the second modulator have linearly polarized components that are perpendicular to each other.

17. The apparatus according to claim 16, wherein a first slow axis of a quarter wave plate of the first modulator and a second slow axis of a quarter wave plate of the second modulator are disposed in a same direction.

18. A stereoscopic image display apparatus comprising:
a polarizing beam splitter for spatially splitting image light emitted by a projector into at least one transmitted beam having a first linearly polarized component and at least one reflected beam having a second linearly polarized component, which is perpendicular to the first linearly polarized component, based on polarized components;

a first modulator configured to modulate the transmitted beam having the first linearly polarized component into a first circularly polarized beam, which is one selected from between a left circularly polarized beam and a right circularly polarized beam modulated through a phase delay of $0\lambda$, during a first time period and to modulate the transmitted beam into a second circularly polarized beam, which is the other selected from between a left circularly polarized beam and a right circularly polarized beam modulated through a phase delay of $½\lambda$, during a second time period, which follows the first time period; and a second modulator configured to modulate the reflected beam having the second linearly polarized component into the first circularly polarized beam modulated through a phase delay of $½\lambda$ during the first time period and to modulate the reflected beam into the second circularly polarized beam modulated through a phase delay of $0\lambda$ during the second time period.

19. The apparatus according to claim 18, wherein each of the first modulator and the second modulator is configured to have a single liquid crystal layer.

20. The apparatus according to claim 18, wherein a first slow axis of a quarter wave plate of the first modulator and a second slow axis of a quarter wave plate of the second modulator are disposed in a same direction.

\* \* \* \* \*